United States Patent [19]
DiVita

[11] 4,252,404
[45] Feb. 24, 1981

[54] SYSTEM FOR TRANSMITTING AND RECEIVING PLURAL MESSAGES VIA A SINGLE FIBER-OPTICAL PATH

[75] Inventor: Pietro DiVita, Turin, Italy

[73] Assignee: CSELT - Centro Studi e Laboratori Telecomunicazioni S.p.A., Turin, Italy

[21] Appl. No.: 8,092

[22] Filed: Jan. 31, 1979

[30] Foreign Application Priority Data

Feb. 9, 1978 [IT] Italy ............... 67254 A/78
Apr. 10, 1978 [IT] Italy ............... 67781 A/78

[51] Int. Cl.³ ............................................. G02B 5/14
[52] U.S. Cl. .......................... 350/96.16; 350/96.15; 350/96.19
[58] Field of Search .............. 350/96.15, 96.16, 96.19

[56] References Cited

U.S. PATENT DOCUMENTS

| 3,244,075 | 4/1966 | Richards et al. | 350/96.15 |
| 3,874,779 | 4/1975 | Thiel | 350/96.16 |
| 3,977,764 | 8/1976 | d'Auria et al. | 350/96.16 |

OTHER PUBLICATIONS

B. E. Kincaid, "Fiber optic data distribution system utilizing ...", Applied Optics vol. 16, No. 9, Sep. 1977, pp. 2355–2356.

R. J. Lynch, "Fiber Optic Connectors", IBM Technical Disclosure Bulletin vol. 13, No. 2, Jul. 1970, pp. 533–534.

*Primary Examiner*—Stewart J. Levy
*Attorney, Agent, or Firm*—Karl F. Ross

[57] ABSTRACT

Several monochromatic light beams of different wavelengths, modulated with respective message signals, are combined at a transmitting station into a composite beam conveyed via a fiber-optical path to a receiving station where the composite beam is resolved into its constituent beams. The mixing and separation of individual beams takes place with the aid of bodies each consisting of two transparent portions whose refractive indices vary as a function of wavelength along curves of different slope intersecting in a common point; a monochromatic beam whose wavelength corresponds to that point passes undeflected through the boundary of these portions whereas the beam or beams of larger wavelength, for which the complement of the critical angle of incidence equals or exceeds the glancing angle, are internally reflected to fall into line with the undeflected beam upon mixing and to deviate therefrom upon separation.

5 Claims, 6 Drawing Figures

SYSTEM FOR TRANSMITTING AND RECEIVING PLURAL MESSAGES VIA A SINGLE FIBER-OPTICAL PATH

FIELD OF THE INVENTION

My present invention relates to a system for simultaneously transmitting and receiving plural messages via a single light-conductive path.

BACKGROUND OF THE INVENTION

Multimode optical fibers are capable of conveying modulated monochromatic light beams of different wavelengths, especially in the ranges of 0.86 to 0.9$\mu$ and 1.06 to 1.3$\mu$ for which the attenuation of such optical fibers is at a minimum.

Conventional systems of this type utilize prisms or equivalent dispersion means at a transmitting station for refractively combining the several constituent beams into a single composite beam and at a receiving station for redistributing the several constituent beams to their respective destinations. Even with glasses or other transparent materials of large dispersion ratio, the relatively narrow spread of available wavelengths limits the number of monochromatic beams that can be conveniently separated and channeled to respective loads such as photodetectors for demodulation. Other optical means heretofore used for the mixing of individual beams, such as semitransparent beam splitters, have the disadvantage of large transmission losses.

OBJECT OF THE INVENTION

The general object of my present invention, therefore, is to provide improved means at both the transmitting and the receiving end of a fiber-optical path for facilitating the concentration of beams from different sources and their subsequent redistribution to respective loads.

SUMMARY OF THE INVENTION

I realize this object, in conformity with my present invention, by providing respective light-guiding means at a transmission station and at a receiving station, each light-guiding means including at least one transparent body with two portions adjoining each other along an interface and having refractive indices which vary as a function of wavelength along curves of different slope intersecting at a common point. The point of intersection corresponds to the wavelength of one of the monochromatic beams, generally the one of the shortest wavelength, to be combined with or separated from one or more additional beams fed to or collected from a common fiber-optical or similar light-conductive path. This individual beam, for which the refractive index on opposite sides of the interface is the same, thus passes undeflected through the boundary between the two transparent portions while all the others are totally internally reflected at that boundary, provided that the refractive indices of these portions for the wavelength of any such other monochromatic beam traversing the body are sufficiently different from each other to establish a critical angle of incidence whose complement is equal to or greater than the glancing angle by which that other beam strikes the interface.

If m>2 is the number of beams to be combined or separated, each station comprises a cascade of m−1 such bodies; the reflected beams of any preceding body in the cascade are then trained upon the interface of an immediately succeeding body.

The several bodies of a cascade may be spaced apart by air gaps, yet it is also possible to form one of the portions of each body as part of a unitary prism within which all the reflected beams pass from one interface to the next.

BRIEF DESCRIPTION OF THE DRAWING

The above and other features of my invention will now be described in detail with reference to the accompanying drawing in which.

SPECIFIC DESCRIPTION

Figure 1:
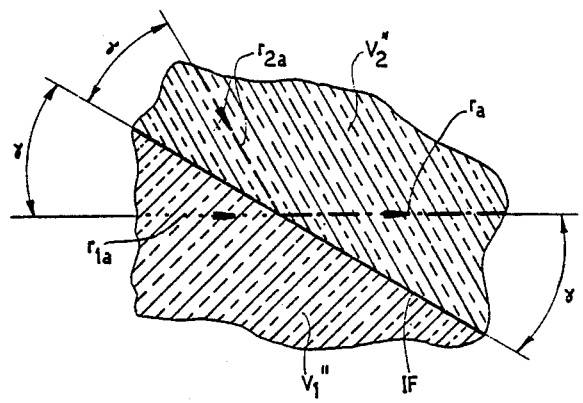
FIG. 1 is a diagrammatic representation of a portion of a transparent body used in a system according to my invention.

In FIG. 1 I have shown part of a transparent body consisting of two portions $V_1''$, $V_2''$ adjoining each other along a planar boundary IF. Such a body may be used either at the transmitting end or at the receiving end of a fiber-optical communication system according to my invention; in the particular instance illustrated in FIG. 1, it forms part of a transmitter and receives two incident beams $r_{1a}$ and $r_{2a}$ from different sources not shown, e.g. lasers or light-emitting diodes. Beam $r_{1a}$ is monochromatic and has a wavelength $\lambda_1$ for which the refractive indices of the glasses or other transparent materials of body portions $V_1''$ and $V_2''$ are identical; this beam, accordingly, passes unreflected and without change in direction through the interface IF. The other beam $r_{2a}$ is likewise assumed to be monochromatic, of a wavelength $\lambda_2 > \lambda_1$, though it could also be composed of several constituent beams all having wavelengths greater than that of beam $r_{1a}$ for which the refractive index of body portion $V_1''$ is less than that of portion $V_2''$. Thus, the following relationships exist for the refractive indices $n_1''$ and $n_2''$ of portions $V_1''$ and $V_2''$:

$$n_1''(\lambda_1) = n_2''(\lambda_1) \tag{1}$$

$$n_1''(\lambda_2) < n_2''(\lambda_2) \tag{2}$$

With the two beams $r_{1a}$ and $r_{2a}$ approaching the interface IF at the same glancing angle $\alpha$, but from opposite sides, beam $r_{2a}$ will be fully reflected at that interface so as to merge with beam $r_{1a}$ into a composite outgoing beam $r_a$, provided that the angle $\alpha$ is not greater than the complement of the critical angle of incidence for wavelength $\lambda_2$ given by $$\sin \frac{n_1''(\lambda_2)}{n_2''(\lambda_2)}.$$

whence $$\alpha \leq \arccos \frac{n_1''(\lambda_2)}{n_2''(\lambda_2)} \tag{3}$$

It will be apparent that, if the body consisting of portions $V_1''$ and $V_2''$ is part of a receiving station, an incoming composite beam in line with beam $r_a$ and of the same spectral composition (but traveling in the opposite direction) will be split at the interface IF into two constituent beams exiting from the body in line with beams $r_{1a}$ and $r_{2a}$, respectively.

Since the critical angle for any given wavelength is sharply defined, and since the angle included between the constituent rays $r_{1a}$ and $r_{2a}$ can be up to twice the complement of that critical angle, these constituent beams can be readily combined and separated even if the difference between the refractive indices $n_1''(\lambda_2)$ and $n_2''(\lambda_2)$ is quite small.

Figure 2:
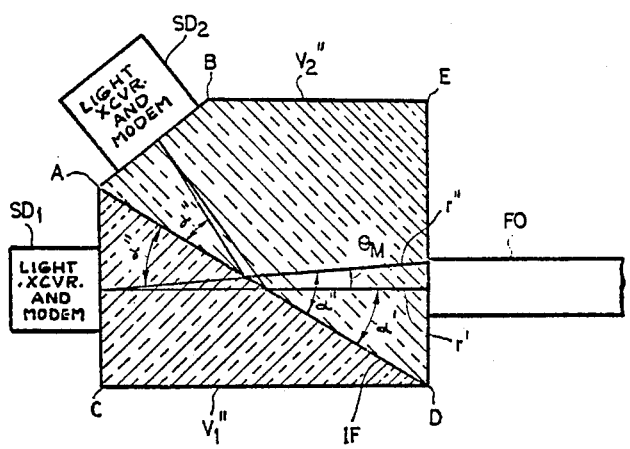
FIG. 2 is a complete cross-sectional view of such a body shown together with associated elements.

In FIG. 2 I have shown the complete transparent body, shaped as a prism with corners A, B, C, D and E; two adjoining faces A-B and A-C of the prism are inclined with respect to interface IF at an angle which is the complement of an angle $\alpha'$ included between that interface and a ray $r'$ passing axially through an optical fiber FO perpendicularly adjoining the face D-E. A limiting ray $r''$ is defined by the maximum acceptance angle $\theta_M$ of the fiber, i.e. the angle by which an incident ray may deviate from the axis while still being internally reflected so as to be transmitted along the fiber. Juxtaposed with the faces A-B and A-C remote from the fiber end are two transducers $SD_1$ and $SD_2$ operating either as sources of modulated light beams or as detectors and demodulators therefor, depending on whether the assembly of FIG. 2 is used at a transmitting or at a receiving station. The modulated monochromatic beams originating at or destined for these transducers, therefore, should have central rays corresponding to the positions of beams $r_{1a}$ and $r_{2a}$ of FIG. 1, including the aforementioned angle $\alpha'$ with interface IF, and limiting rays including therewith a maximum angle $\alpha'' = \alpha' + \theta_M$. Since, in order to be reflected at the interface IF, the limiting ray of transducer $SD_2$ must have a glancing angle $\alpha''$ conforming to relationship (3), the beam angle $\alpha'$ is given by $$\alpha' \leq \arccos \frac{n_1''(\lambda_2)}{n_2''(\lambda_2)} - \theta_M. \tag{4}$$

Figure 3:
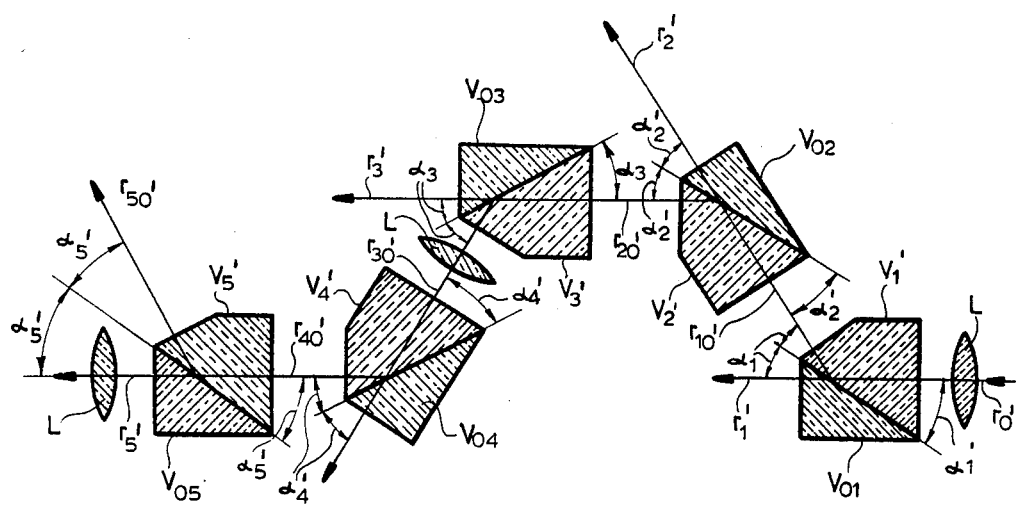
FIG. 3 shows a receiving station provided with a multiplicity of cascaded bodies of the type shown in FIG. 2.
Figure 4:
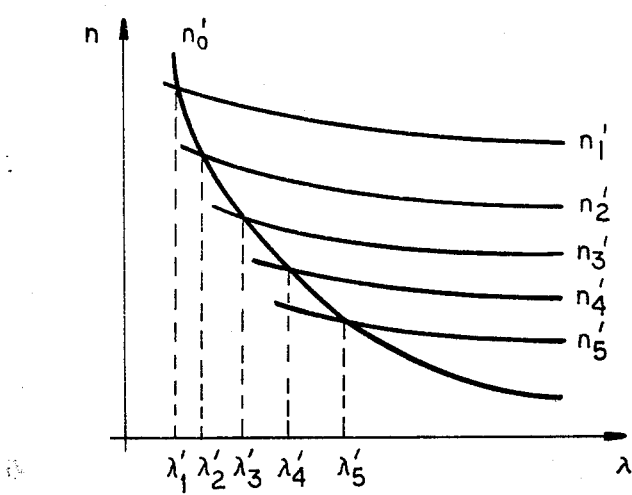
FIG. 4 is a graph representing the refractive indices of several body portions of FIG. 3, plotted against wavelength.

In FIG. 3 I have shown a cascade of five prismatic bodies forming part of a beam separator at a receiving station; again, a like arrangement can be used as a beam mixer at a transmitting station with a reversal of the direction of beam propagation. Each body is composed of a first portion $V_{01}, V_{02}, V_{03}, V_{04}, V_{05}$, all with identical refractive-index characteristics shown at $n_0'$ in FIG. 4, and of a respective second portion $V_1', V_2', V_3', V_4', V_5'$ whose refractive-index characteristics $n_1', n_2', n_3', n_4'$ and $n_5'$ are also shown in FIG. 4, plotted against wavelength $\lambda$. An incoming beam $r_0'$, emitted by a nonillustrated fiber, traverses a lens or lens group L serving to concentrate its light rays and to correct possible chromatic aberrations. Similar optical components may be disposed, as shown, in some or all of the air gaps between successive prisms and downstream of the entire cascade.

Composite beam $r_0'$ strikes the interface of the first body at a glancing angle $\alpha_1'$ and is split into two of its constituents, i.e. a nonreflected monochromatic beam $r_1'$ of wavelength $\lambda_1'$ and a reflected composite beam $r_{10}'$ consisting of at least five monochromatic beams of larger wavelengths. Beam $r_{10}'$, passing perpendicularly and thus without refraction through an exit face of the first body and through a confronting entrance face of the second body, strikes the interface of the latter at an angle $\alpha_2'$ and is partly decomposed into a monochromatic beam $r_2'$ of wavelength $\lambda_2'$, continuing straight on, and a reflected beam $r_{20}'$ containing the remaining constituent beams. In an analogous manner, beam $r_{20}'$ strikes the interface of the third body to divide into an undeflected monochromatic beam $r_3'$, of wavelength $\lambda_3'$, and a reflected beam $r_{30}'$ impinging upon the interface of the fourth body at an angle $\alpha_4'$. After separation from a monochromatic beam $r_4'$ of wavelength $\lambda_4'$, passing straight through the last-mentioned interface, the remaining constituents enter the last body in the form of a beam $r_{40}'$ including an angle $\alpha_5'$ with its interface. A monochromatic beam $r_5'$ of wavelength $\lambda_5'$, split off the beam $r_{40}'$, continues undeflected in line with the incoming beam $r_0'$, while the remaining constituent or constituents, which may be unmodulated, are reflected as a beam $r_{50}'$. Each of the monochromatic beams thus isolated is intercepted by an individual photoelectrical demodulator for recovery of the message signals respectively conveyed thereby. Though these monochromatic beams are shown to pass perpendicularly through the corresponding exit faces, such perpendicularity is not essential. These faces, in fact, can be inclined with reference to the internal beam paths at angles enabling a more convenient arraying of the several photodetectors (or sources in the case of a transmitting station). The faces traversed by the polychromatic beams, on the other hand, should be generally perpendicular thereto in order to obviate dispersion (except in the case of beam $r_{50}'$ if the latter carries no message signals); they may, however, be slightly curved for focusing or aberration-correcting purposes.

As shown in the $n/\lambda$ diagram of FIG. 4, the refractive index $n_0'$ of body portions $V_{01}-V_{05}$ follows a curve whose slope is substantially steeper than that of the family of curves $n_1'-n_5'$ representing the refractive indices of portions $V_1'-V_5'$. Thus, the material of the first body portions $V_{01}-V_{05}$ is of a more highly dispersive character than those of the second portions $V_1'-V_5'$, at least within the wavelength range here considered which is preferably in the near-infrared region of the spectrum in conformity with the values given above. The points of intersection of curve $n_0'$ with curves $n_1'-n_5'$ coincide with the wavelengths $\lambda_1'-\lambda_5'$ of beams $r_1'-r_5'$, respectively. Thus, it is always the constituent beam of the shortest wavelength which encounters no discontinuity at the interface of the two body portions and is separated from the other constituents which are totally reflected.

In general, a cascade of transparent bodies as shown in FIG. 3 must conform to the following relationships for a generic refractive index $n_i'$, a generic glancing angle $\alpha_i'$ and generic wavelengths $\lambda_i', \lambda_j'$ (with $\lambda_j > \lambda_i$), i being any positive integer up to the number m of cascaded bodies:

$$n_0(\lambda_i') = n_i'(\lambda_i') \tag{5}$$

$$n_0(\lambda_{i+1}') < n_i'(\lambda_{i+1}') \tag{6}$$

$$n_{i+1}'(\lambda_j') < n_i'(\lambda_j') \tag{7}$$

$$\alpha_i' \leq \arccos \frac{n_0(\lambda_{i+1}')}{n_i'(\lambda_{i+1}')} \quad (8)$$

Figure 5:
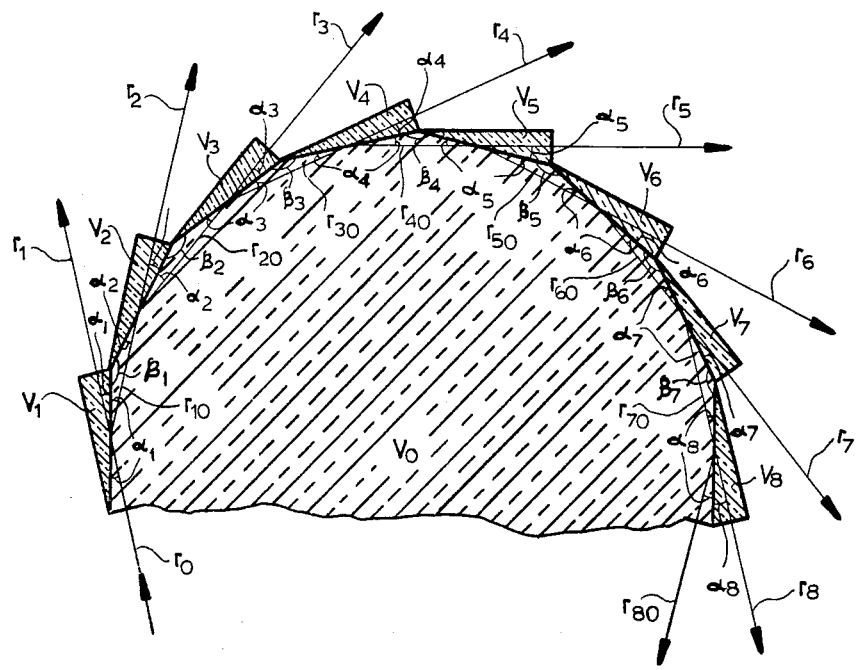
FIG. 5 is a cross-sectional view of a modified set of cascaded bodies partly formed by a unitary prism.
Figure 6:
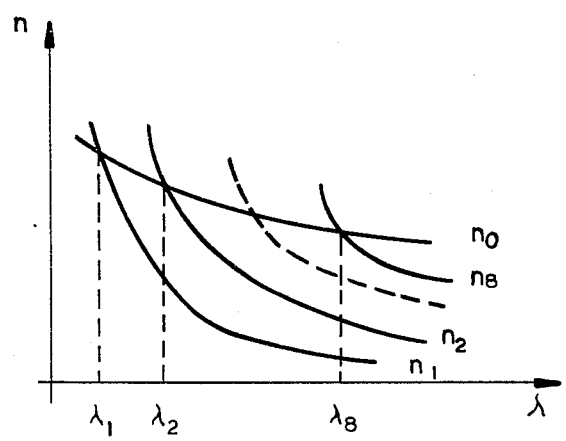
FIG. 6 is a graph similar to FIG. 4 but relating to the assembly of FIG. 5.

The identity of the characteristic $n_0'$ for all the body portions $V_{01}-V_{05}$ of lower overall optical density, while convenient, is not essential as long as requirements (5) through (8) are satisfied within each body. The opposite condition, i.e. an identity of the refractive indices of the body portions of higher overall optical density, is implemented in the structure of FIG. 5 where a polygonal prism $V_0$ of refractive index $n_0$ (FIG. 6) is common to all the cascaded bodies, the sides of the polygon forming interfaces between the central prism and a multiplicity of peripheral body portions $V_1, V_2, \ldots V_8$ with different refractive indices $n_1, n_2, \ldots n_8$, respectively. In this instance the characteristic $n_0$ is shallower than the family of curves representing the characteristics $n_1-n_8$ which it intersects at points corresponding to progressively larger wavelengths $\lambda_1, \lambda_2, \ldots \lambda_8$, respectively. In this embodiment, therefore, the individual body portions $V_1-V_8$ are more highly dispersive than common body portion $V_0$.

An incoming composite beam $r_0$, received directly from a fiber (as in FIG. 2) or via an interposed lens as in FIG. 3, passes perpendicularly through an entrance face of prism $V_0$ and strikes its interface with body portion $V_1$ at an angle $\alpha_1$ to yield an outgoing monochromatic beam $r_1$ and a reflected beam $r_{10}$, the latter remaining inside the prism as it travels toward its interface with body portion $V_2$ at an angle $\alpha_2$ with respect thereto. After emitting another monochromatic beam $r_2$, the residual polychromatic beam $r_{20}$ continues within prism $V_0$ toward body portion $V_3$, at a glancing angle $\alpha_3$, and so on; at the last peripheral body portion $V_8$, a monochromatic beam $r_8$ is separated from a reflected beam $r_{80}$, passing perpendicularly through an exit face of the prism, which may or may not be monochromatic and could be unmodulated. The reversibility of the array for transmission purposes, discussed in connection with FIG. 3, also applies to the structure of FIG. 5, as do the preceding remarks about planarity and perpendicularity of the entrance and exit faces.

The interfaces of body portions $V_1$ and $V_2$ with central portion $V_0$ adjoin each other as an obtuse angle $\beta_1 = \pi - (\alpha_1 + \alpha_2)$; the corresponding angles between the other polygon sides have been designated $\beta_2 - \beta_7$. Glancing angle $\alpha_1$ is given by an expression analogous to relationship (3), i.e.

$$\alpha_1 \leq \arccos \frac{n_1(\lambda_2)}{n_0(\lambda_2)} \quad (9)$$

if the limiting angle $\theta_M$ of an associated optical fiber is disregarded; otherwise, the difference between that glancing angle and the complement of the critical angle of incidence for wavelength $\lambda_2$ (the shortest of all the wavelengths of polychromatic beam $r_{10}$) must be at least equal to the magnitude of that critical angle, by analogy with expression (4). More generally, for a generic refractive index $n_i$, a generic glancing angle $\alpha_i$, a generic peripheral angle $\beta_i$ and generic wavelengths $\lambda_i$, $\lambda_j$ (with $\lambda_j > \lambda_i$), the following relationships must be satisfied:

$$n_0(\lambda_i) = n_i(\lambda_i) \quad (10)$$

$$n_0(\lambda_{i+1}) > n_i(\lambda_{i+1}) \quad (11)$$

$$n_{i+1}(\lambda_j) > n_i(\lambda_j) \quad (12)$$

$$\alpha_i \leq \arccos \frac{n_i(\lambda_{i+1})}{n_0(\lambda_{i+1})} \quad (13)$$

$$\beta_i = \pi - (\alpha_i + \alpha_{i+1}) \quad (14)$$

In all instances, the corrective measures mentioned above may be replaced or supplemented by curved rather than flat interfaces. It may also be desirable in some cases to interpose transparent fillers of the same refractive index as an adjoining body portion between the latter and the associated source or load. Finally, the light-conductive path between the transmitting and receiving stations could be constituted by a thin foil or some other optical waveguide in lieu of a fiber.

An exact correspondence between the wavelength of a monochromatic beam to be separated or admixed and the point of intersection of the refractive-index characteristics on opposite sides of the interface to be traversed by such beam, while desirable, is not always essential. Thus, a slight discontinuity at that interface may be utilized for enabling a more convenient orientation of that monochromatic beam.

I claim:

1. A system for simultaneously conveying a plurality of messages between a transmitting station and a receiving station interconnected by a light-conductive path, comprising:

a number $m > 2$ of sources of monochromatic light beams of different wavelengths modulated by respective messages at said transmitting station;

a like number $m > 2$ of demodulators for said light beams at said receiving station;

first light-guiding means at said transmitting station inserted between said sources and said path for combining said monochromatic light beams into a single composite beam traveling over said path; and second light-guiding means at said receiving station inserted between said path and said demodulators for splitting said composite beam into its constituent monochromatic beams respectively fed to said demodulators;

at least one of said light-guiding means including a common transparent body with flat faces adjoining each other at obtuse angles and $(m-1)$ other transparent bodies each contacting one of said faces, said contacting bodies having refractive indices varying as a function of wavelength along respective curves of different slope, the refractive-index curve of said common body intersecting the refractive-index curve of each one of said adjoining bodies at a point which substantially corresponds to the wavelength of one of said monochromatic beams whereby the latter passes substantially undeflected through the interface between said common body and a respective one of said adjoining bodies, the refractive indices of said contacting bodies for the wavelength of any other monochromatic beam traversing said common body being sufficiently different from that of said common body to establish a critical angle of incidence whose complement at least equals the glancing angle by which such other beam strikes said interface whereby each such other beam is reflected at said interface and passes entirely within said common body from one interface to the next.

2. A system as defined in claim 1 wherein the curves of the refractive indices of said adjoining bodies successively situated on said common body intersect the curve of the refractive index of said common body at progressively longer wavelengths.

3. A system for simultaneously conveying a plurality of messages between a transmitting station and a receiving station interconnected by a light-conductive path, comprising:
- a number m>2 of sources of monochromatic light beams of different wavelengths modulated by respective messages at said transmitting station;
- a like number m>2 of demodulators for said light beams at said receiving station;
- first light-guiding means at said transmitting station inserted between said sources and said path for combining said monochromatic light beams into a single composite beam traveling over said path;
- second light-guiding means at said receiving station inserted between said path and said demodulators for splitting said composite beam into its constituent monochromatic beams respectively fed to said demodulators, at least one of said light-guiding means including m−1 transparent bodies in cascade with at least one intervening air gap bounded by faces perpendicular to the beam direction, each of said bodies consisting of two portions adjoining each other along an interface, said portions having refractive indices varying as a function of wavelength along curves of different slope intersecting at a common point which substantially corresponds to the wavelength of one of said monochromatic beams whereby the latter passes substantially undeflected through said interface, the refractive indices of said portions for the wavelength of any other monochromatic beam traversing said body being sufficiently different from each other to establish a critical angle of incidence whose complement at least equals the glancing angle by which such other beam strikes said interface whereby each such other beam is reflected at said interface, the reflected beams of any preceding body in the cascade being trained upon the interface of an immediately succeeding body; and
- focusing means inserted in said air gap for concentrating the light rays of said composite beam.

4. A system as defined in claim 3 wherein all cascaded bodies have first portions of substantially identical transparent material and second portions of mutually different transparent materials.

5. A system as defined in claim 4 wherein the curves of the refractive indices of said second portions of successive bodies intersect the curve of the refractive index of said first portions at progressively longer wavelengths.

* * * * *